Dec. 4, 1962  G. L. STEVENS  3,066,557
BALL TYPE UPSETTING APPARATUS
Filed Jan. 29, 1960
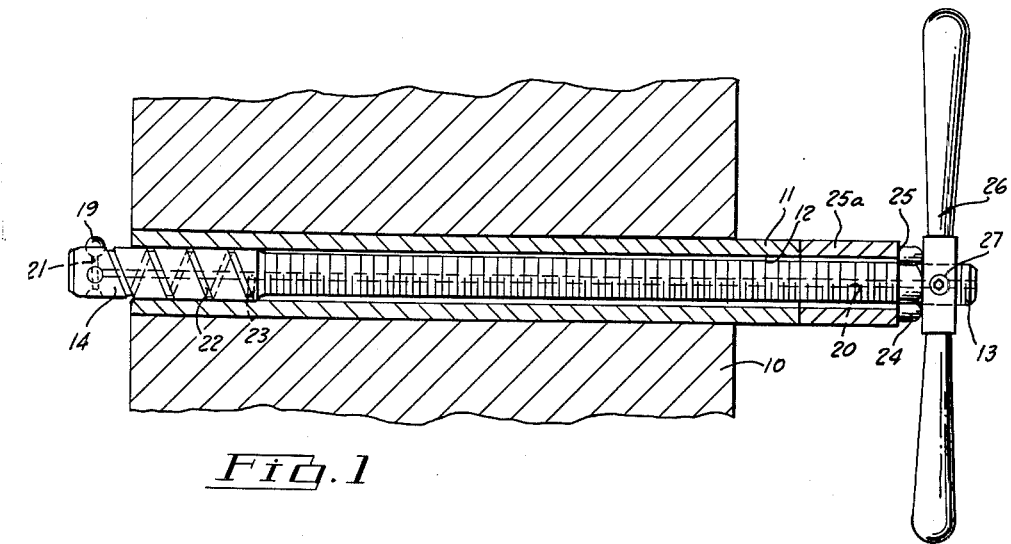
Fig. 1
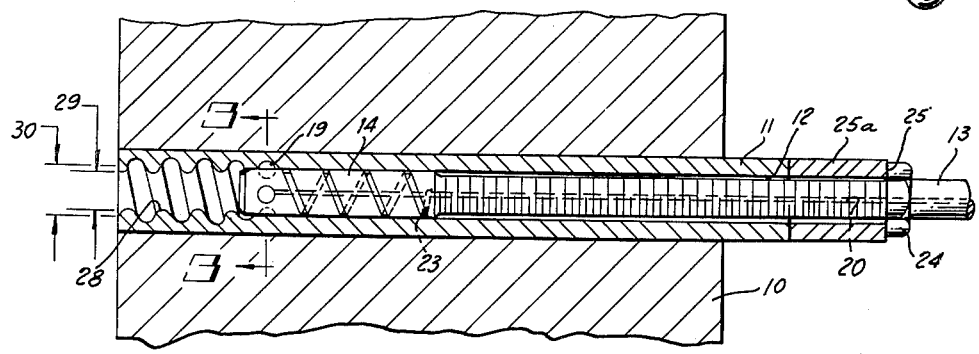
Fig. 2
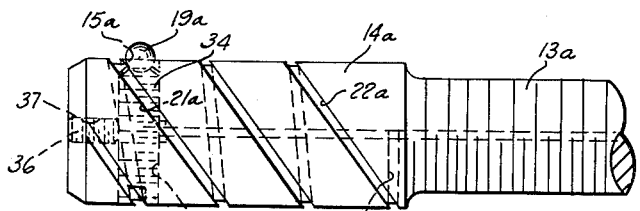
Fig. 4
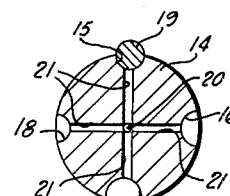
Fig. 3
Fig. 6
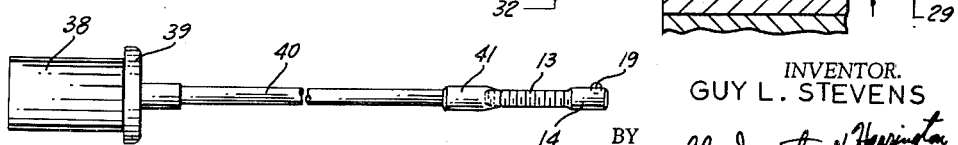
Fig. 5
INVENTOR.
GUY L. STEVENS
BY
Donnelly, Mentag & Harrington
ATTORNEYS 3,066,557
BALL TYPE UPSETTING APPARATUS
Guy L. Stevens, Novi, Mich., assignor to Hastings Manufacturing Company, Hastings, Mich.
Filed Jan. 29, 1960, Ser. No. 5,432
7 Claims. (Cl. 80—17)

This invention relates generally to the metal upsetting art, and more particularly to a novel ball type upsetting apparatus for use in re-sizing holes in metal devices.

It is an important object of the present invention to provide a metal displacer or upsetting device which includes a metal ball member operatively mounted on one end of a drawbar whereby when the drawbar is pulled through a hole in a metal object in a spiral or threaded manner, the metal forming the side walls of the hole will be displaced radially inwardly in a threaded form so as to reduce the diameter of the hole and put it in condition for re-sizing by means of a reaming action or the like.

It is a further object of the present invention to provide a ball type metal upsetting apparatus which is economical of manufacture, simple and compact in construction, and efficient in operation.

It is another object of the present invention to provide a method for re-sizing holes comprising the steps of upsetting the metal around the periphery of the hole and then reaming the hole to the desired new size.

Other objects, features and advantages of this invention will be apparent from the following detailed description and appended claims, reference being had to the accompanying drawing forming a part of the specification wherein like reference numerals designate corresponding parts of the several views.

In the drawing:

FIG. 1 is a fragmentary sectional view of a valve stem sleeve in a cylinder head and showing the upsetting apparatus of the present invention mounted in the sleeve preparatory to performing an upsetting operation therein;

FIG. 2 is a view similar to that of FIG. 1, but showing the upsetting tool disposed in a position part-way through an upsetting operation;

FIG. 3 is an elevational sectional view of the upsetting tool structure shown in FIG. 2, taken along the line 3—3 thereof and looking in the direction of the arrows;

FIG. 4 is an enlarged fragmentary elevational view of a modified upsetting apparatus made in accordance with the principles of the invention;

FIG. 5 is a side elevational view of an upsetting apparatus of the present invention showing it as being provided with a power operated drive means; and, FIG. 6 is a fragmentary elevational sectional view of a valve sleeve which has had the hole therethrough upset in accordance with the invention, and which is being re-sized by means of a reaming tool.

Referring now to the drawing and in particular to FIGS. 1, 2 and 3, the numeral 10 designates a fragmentary portion of an engine cylinder head in which is mounted a conventional valve stem guide or sleeve 11, the sleeve 11 having a bore 12 therethrough which is over-sized from extensive use and which is to be brought back to its standard size by means of an upsetting operation in accordance with the present invention. As shown in FIGS. 1 and 2, the upsetting apparatus of the present invention includes the elongated threaded drawbar 13 which is provided at the front end thereof with the pilot or head 14. The pilot 14 is formed to a size whereby it will slide freely through the hole 12 and serve as a pilot or guide means for the upsetting tool. Although the pilot 14 is shown as being formed integral with the smaller diameter drawbar 13, it will be obvious that it could be detachably connected to the drawbar 13 by suitable means. As shown in FIG. 3, a plurality of annularly spaced hemispherical recesses 15, 16, 17, and 18 are formed on the outer end of the pilot 14. A hardened steel ball as 19 is adapted to be rotatably seated in one of these recesses as shown in FIGS. 1 through 3. The recesses 15 through 18 are formed to different radii so as to provide recesses of varying sizes to hold various size upsetting balls.

As shown in FIGS. 1 through 3, an axial hole 20 extends inwardly through the drawbar 13 from the rear end thereof and through the pilot 14 to a point beneath the recesses 15 through 18. The hole 20 communicates at the forward end thereof with the recesses 15 through 18 by means of the radial passages 21. It will be seen that lubricating oil may be forced through the passages 20 and 21 for lubricating purposes during an upsetting operation. The pilot 14 may also be provided with a spiral groove 22 around the outer periphery thereof which is connected to the passage 20 by means of the passage 23. The passage 23 and groove 22 thus permit lubricating oil to be forced between the pilot 14 and the hole 12 in the valve sleeve 11.

The upsetting operation may be carried out by first passing the drawbar through the hole 12 from the left side thereof as viewed in FIG. 1. A nut 24 is then threaded onto the rear end of the drawbar 13 and into abutting engagement against the end 25 of the spacer sleeve 25a. A cross bar 26 is then fixedly mounted on the rear end of the drawbar 13 by any suitable means, as by the lock screw 27. It will be seen that when the cross bar 26 is rotated, the drawbar 13 will be rotated and simultaneously drawn through the hole 12 to the right as viewed in FIG. 1. FIG. 2 shows the upsetting tool in a position wherein the drawbar has been partially drawn through the hole 12 so as to upset the left end portion of the hole 12. It will be seen from an inspection of FIG. 2 that the ball 19 forms a thread in the bore 12 as the ball is drawn through the hole, whereby the metal forming the walls of the hole 12 is upset and displaced radially inwardly to form a spiral inwardly extended thread as indicated by the numeral 28 and a corresponding outwardly extended groove. The thread is formed with a rounded head as shown in FIG. 2 and closes or shrinks the diameter of the hole 12 to a smaller size as indicated by the numeral 29. The total decrease in the diameter of the hole 12 from the starting diameter indicated by the numeral 30 is dependent upon the distance that the ball 19 extends outwardly beyond the periphery of the pilot 14. For example, if the ball 19 extends for .007 of an inch beyond the periphery of the pilot 14, the hole 12 will be reduced in effective diameter by .014″. The amount of closure of the hole 12 may be regulated as stated hereinbefore by using smaller or larger size balls 19 disposed in the corresponding smaller or larger holes 15 through 18.

FIG. 6 illustrates the step of reaming the valve stem back to its desired size. The numeral 31 indicates a conventional reamer which may be used to ream the high parts of the inwardly thread 28 so as to re-size the hole 12 and bring it back to its desired diameter as designated by the numeral 32. It will be seen that the reamer brings the valve stem bore 12 back to its standard size. It has been found that the upsetting of the metal in the manner described provides a better bearing surface because of the cold working of the metal during the upsetting operation. The grooves 33 which are left in the bore surface after the reaming operation also provide for better lubrication of the valve stem during operation. The present invention eliminates the need for oversize replacement parts. It has also been found that a valve sleeve re-bored by the method of the present invention provides the same service life as a new similar part.

In order to hold the ball 19 in its recess during mounting of the tool in a hole to be upset the pilot 14 may be magnetized. Furthermore, it will be understood that different size balls 19 provide for different upsetting amounts of metal, as desired.

FIG. 4 shows a modification of the invention in which the steel ball 19a is adjustable inwardly and outwardly of the pilot 14a to provide for different depths of upsetting. The ball 19a is seated in the concave nose of a conventional Allen screw 34 which is threaded into the pilot 14a in a transverse position in the hole 35 which communicates with the recess 15a. The screw 34 may be locked in place by means of the lock screw 36 which is threaded in the axial hole 37 which communicates with the hole 35.

FIG. 5 illustrates a power drive means for the draw bar 13. The numeral 38 indicates a conventional electric motor provided with a gear reduction means 39 of any suitable type and which in turn drives a conventional flexible drive shaft 40. The shaft 40 is provided with a chuck for operatively engaging the outer end of the draw bar 13 for rotating the same.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. An upsetting device of the class described, comprising: a draw bar having the one end thereof threaded; a pilot formed on the other end of said draw bar; said draw bar and pilot being provided with oil passages; a steel ball carried by said pilot and disposed to protrude beyond the side thereof; and, means for rotating said draw bar relative to a surface which is to be upset by the device.

2. An upsetting device of the class described, comprising: a draw bar having the one end thereof threaded; a pilot formed on the other end of said draw bar; a steel ball carried by said pilot and disposed to protrude beyond the side thereof; and, means for rotating said draw bar relative to a surface which is to be upset by the device.

3. The structure as defined in claim 2 wherein: said pilot is provided with means for mounting the steel ball in different radial positions relative to the longitudinal axis of the pilot.

4. The structure as defined in claim 2, wherein: said means for rotating said draw bar comprises, a spacer member mounted on the threaded end of the draw bar and operative to abut the object to be worked on; a nut threaded onto the threaded end of the draw bar and into engagement with the spacer member; and, a cross bar fixed on the threaded end of said draw bar for rotating the same.

5. The structure as defined in claim 2, wherein: said means for rotating said draw bar comprises, a spacer member mounted on the threaded end of the draw bar and operative to abut the object to be worked on; a nut threaded onto the threaded end of the draw bar and into engagement with the spacer member; and, a power driven means connected to the threaded end of said draw bar for rotating the same.

6. A hole re-sizing device comprising: a draw bar; a steel ball mounted on one end of said draw bar; said draw bar being mounted through said hole with the steel ball protruding beyond the outer surface of the draw bar and adapted to engage the side walls of the hole; and, means for drawing said draw bar through the hole in a rotative manner, whereby the steel ball will be drawn through the hole and into upsetting engagement with the hole side walls to upset the same and shrink the diameter of the same.

7. The method of re-sizing a hole in an object comprising, the steps of, first upsetting the side walls of the hole with a hard ball drawn through the hole in a rotative manner so as to shrink the diameter of the hole, and secondly, reaming the hole back to the desired size.

References Cited in the file of this patent

UNITED STATES PATENTS

| | | |
|---|---|---|
| 847,710 | Vaughan | Mar. 19, 1907 |
| 969,452 | Boggs | Sept. 6, 1910 |
| 1,010,127 | Dingley | Nov. 28, 1911 |
| 2,349,863 | Hallberg | May 30, 1944 |
| 2,372,011 | Remington et al. | Mar. 20, 1945 |
| 2,625,065 | Trishman | Jan. 13, 1953 |
| 2,872,720 | Ramsay | Feb. 10, 1959 |